Patented May 11, 1943

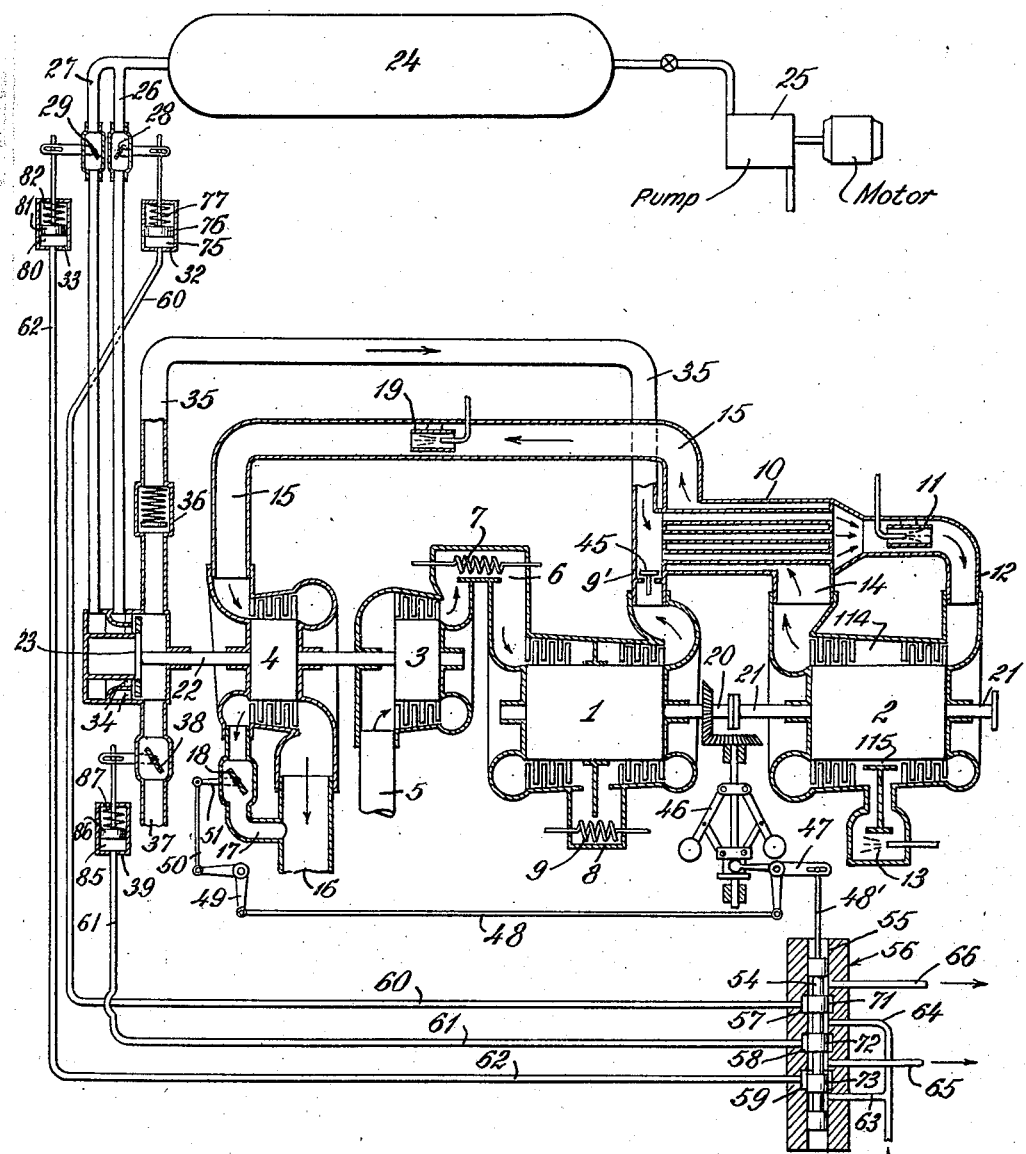

2,318,905

UNITED STATES PATENT OFFICE 2,318,905

GAS TURBINE PLANT

Walter Traupel, Winterthur, Switzerland, assignor to Sulzer Frères, Société Anonyme, Winterthur, Switzerland Application May 4, 1940, Serial No. 333,318
In Switzerland May 10, 1939

5 Claims. (Cl. 60—41)

This invention relates to a gas turbine plant and has for its object the provision of certain improvements for the rapid regulation of the plant. The plant comprises at least one turbo compressor operatively connected to at least one power turbine arranged to drive the load, a charging set comprising a charging blower and a charging turbine arranged to work at variable speeds, and an accelerating turbine operatively connected to the charging set. The rotors of the charging unit and the accelerating turbine are preferably on the same or interconnected shafts and the accelerating turbine is arranged to receive gas, at least temporarily, when the load on the power turbine increases suddenly decreasing its speed, to accelerate the charging set.

The accelerating turbine is preferably provided with automatically controlled valve means for operating the accelerating turbine as required in accordance with changes in the speed of the power turbine. The accelerating turbine may be supplied with air, gas or a gas mixture (hereinafter called gas) supplied to it from a container in which the gas is under a suitable pressure, preferably at least 20 atmospheres. When passing from the container into the accelerating turbine, the gas may be passed through a heat storage system. The outlet side of the accelerating turbine is connected by pipe to the turbine plant and the gas, after passing through the accelerating turbine, is passed through the pipe to the turbine plant. Preferably at or near the place where the pipe connects to the accelerating turbine, a check valve is mounted in the pipe to prevent a return of the gas to the accelerating turbine.

The accelerating turbine may also be provided with valve controlled means for discharging gas from the outlet side directly to the atmosphere. Several valve controlled pipes may be provided for introducing gas from the container to the accelerating turbine, and the valves may be controlled to permit the gas to flow to the accelerating turbine through one or all of the pipes as required. The regulation of the gas charged into the accelerating turbine may be effected by throttling or by any other suitable way. The accelerating turbine may have several guide wheels, for example concentric wheels, which receive gas over the whole periphery. It may be a single-stage impulse wheel.

The accelerating turbine is preferably provided with means making it automatically responsive to sudden changes in load, and to this end the valves in the pipe connecting the container with the accelerating turbine are arranged to be operated by means responsive to the speed of the power turbine. I have found it advantageous to actuate the valves by servomotors controlled by a speed governor operated by the power turbine, preferably by the rotor shaft.

The single figure of the accompanying drawings illustrates more or less diagrammatically apparatus embodying the invention.

The gas turbine plant comprises a turbo compressor 1 and a power turbine 2 arranged to receive gas at a high pressure from a special charging set comprising the charging blower 3 and the charging turbine 4. The air is drawn in from the atmosphere by the blower 3 through conduit 5, compressed, and passed through the cooler 6, having one or more cooling coils 7, and into the turbo compressor. In the compressor 1, for example when using intermediate cooling in the cooler 8, having one or more cooling coils 9, the air is further compressed to the highest pressure of the system, for example to 8 atmospheres absolute. The gas passes through pipe 9' into the recuperator 10, from there into the main combustion chamber 11, and then through pipe 12 into the intake side of power turbine 2.

The highly heated gas expands in the turbine 2 and in passing therethrough is preferably heated at an intermediate stage in the combustion chamber 13. The intermediate heating is preferably effected by only a part of the gas being conducted through the combustion chamber 13, while the other part flows further direct to the low-pressure stages through the intermediate spaces 114 and 115. The part led through the combustion chamber 13 is, after it has been heated by added fuel, also led into the low-pressure stage, where it mixes again with the other part. While the gas expands to a low pressure in turbine 2, it is still considerably above atmospheric pressure as it is discharged into pipe 14 from which it flows through the recuperator 10 and pipe 15 to the turbine 4. The gas expands in driving turbine 4 and is discharged to the atmosphere through conduit 16. The turbine 4 drives the blower 3. By altering the speed of the charging set 3 and 4, the pressure condition of the whole plant can be changed and thereby regulated in a very economical manner.

The change of speed of the charging set 3 and 4 may be effected in various ways. In the present apparatus for instance, a bypass pipe 17 with valve 18 is provided to bypass a part of the gas from pipe 15 to the atmosphere, for example through the pipe 16. The investigation shows that this regulation is economical in spite of the fact that the gas which flows through the bypass is not utilized. For the purpose of increasing the available power of the charging set, one or more auxiliary burners 19 may be provided to increase the temperature of the gas before it enters the turbine 4.

The rotors of the compressor 1 and turbine 2 are mounted on or connected to interconnected shafts 20 and 21 respectively and shaft 21 is arranged to be connected to and drive the load, for example, an electric generator, ship propeller, or the like. The rotors of the charging set are preferably mounted on or drive the shaft 22. In order to bring the speed of the charging set quickly to the desired amount, when the load is suddenly changed, especially a large amount, an accelerating turbine 23 is arranged to drive, or aid in driving, the shaft 22. The accelerating turbine is preferably designed as an impulse turbine, and since it may operate at a high pressure, it may be of relatively small dimensions.

The turbine 23 is driven by gas under pressure from any suitable source such as the container 24 which is charged with gas by the motor driven pump 25. The gas is preferably passed from the container to the turbine 23 through separate pipes 26 and 27 which are controlled by valves 28 and 29 respectively. The valves 28 and 29 are provided with means for operating them automatically in response to changes in the speed of the turbine 2 as, for example, by means of the servomotors 32 and 33. The gas from pipes 26 and 27 passes over concentric guide-blade discs 34 before entering the turbine 23. After the gas passes through turbine 23 it is discharged into pipe 35 through which it flows to the recuperator 10. The gas from pipes 9' and 35 passses through the recuperator in heat exchange relation to the gas passing through the recuperator from pipe 14 to pipe 15. A check valve 36 is connected to pipe 35 to prevent a return of gas to turbine 23. The discharge side of turbine 23 may be connected directly to the atmosphere by the pipe 37 and valve 38 which is preferably operated by a servomotor 39. When the turbine 23 is not working, it may be connected to the atmosphere by opening the valve 38 thereby reducing the windage loss in the turbine to a minimum. At the place where the gas issues from the main compressor 1, another check valve 45 is provided to prevent gas flowing back through the compressor 1 when the plant is being regulated.

To operate the valves 18, 28, 29 and 38 automatically as a result of changes in the speed of the turbine 2 caused by sudden changes in load, a speed governor 46 is connected to and driven by the shaft 20. The governor is arranged to operate the lever 47 which is operatively connected through rod 48, lever 49, rod 50 and lever 51 to valve 18, and to rod 48' and the slide member 54 which reciprocates in the cylindrical chamber 55 of the slide valve 56. The cylinder 55 has annular grooves 57, 58 and 59 which are connected by pipes 60, 61 and 62 with the cylinders of the servomotors 32, 39 and 33 respectively. The slide member has a number of spaced pistons 71, 72 and 73 arranged to open or close passages to the various pipes connected to the valve.

Pipes 63 and 64 supply a fluid under pressure, for example oil, to the valve for operating the servomotor system and pipes 65 and 66 discharge the fluid to reduce the pressure. The servomotors 32, 33 and 39 each have a cylinder in communication with one of the pipes 60, 61 or 62, a piston and a spring opposing the action of the fluid on the piston. When the fluid is admitted into the cylinder the piston moves against the spring operating the valve, and when the fluid pressure is released, the spring forces the piston in the opposite direction operating the valve in the reverse direction.

The operation of the apparatus is as follows: If the speed if the power turbine 2 decreases, then the governor 46 turns the lever 47 counterclockwise raising the slide member 54. The slide member 54 is so arranged in the cylinder 55 that when the speed of the turbine 2 decreases the valves 28 and 29 are opened successively to admit gas under pressure from the container 24 to the auxiliary turbine 23. As the slide member rises, the piston 71 clears the groove 57 permitting the fluid under pressure in pipe 64 to flow through into pipe 60 and into the cylinder 75 of servomotor 32. The pressure of the fluid on piston 76 is such as to overcome the action of the spring 77 and open the valve 28. This causes the gas to pass through pipe 26 into turbine 23 and to accelerate the action of the charging set 3 and 4, thereby tending to increase the speed of the power plant. At this stage pipe 62 is connected through groove 59 with pipe 65 and there is no pressure acting on the piston 81 of servomotor 33. If the speed of the power plant continues to decrease and the slide member 54 to rise further, the piston 73 closes the passage from pipe 62 through groove 59 to pipe 65 and opens a passage through groove 59 permitting the fluid under pressure to pass from pipe 63 into pipe 62 and into cylinder 80 of servomotor 33. The fluid pressure acting upon piston 81 overcomes the action of the spring 82, thereby opening the valve 29 permitting an additional quantity of gas to flow from the container 24 through pipe 27 to the accelerating turbine 23.

If, on the contrary, the speed of turbine 2 increases turning the lever 47 clockwise lowering the slide member 54, then the valves 28 and 29 are closed successively in reverse order. When piston 73 moves downward a short distance it closes the path of communication between pipes 62 and 63 and opens a path of communication between pipe 62 and 65 discharging the fluid permitting the spring 82 to force the piston 81 downwardly, thus closing valve 29. Further downward action of the slide member 54 closes the path of communication between pipes 60 and 64 and opens a path of communication between pipes 60 and 66, discharging the fluid and permitting the spring 77 to force the piston 76 downwardly, thereby closing valve 28. When valves 28 and 29 are closed, the piston 72 is in such a position that there is a communicating passage between pipes 61 and 64, thereby admitting the fluid under pressure into the cylinder 85 moving the piston 86 upward against the action of spring 87 and opening valve 38 discharging gas from pipe 37 to the atmosphere. When the slide member 54 rises, the piston 72 closes the path of communication between pipes 61 and 64 and opens the path of communication between pipes 61 and 65, thereby discharging the fluid and permitting the spring 87 to move the piston 86 downward to close valve 38.

The gas under pressure flows through the turbine 23 which transmits considerable power to the charging set 3 and 4. The charging turbine 4 and the charging compressor 3 are accelerated.

The gas passes through pipe 35 into the power turbine 2 and there helps to charge it to a higher pressure. Consequently, a greatly increased pressure is formed very rapidly in pipe 14 connecting the outlet side of turbine 2 with pipe 15, and simultaneously at the inlet side of charging turbine 4, so that the charging turbine also causes a great acceleration of the charging set 3 and 4.

The quantity of gas flowing into the turbine plant may then be so great that the limit of the pumping capacity of the turbo compressor 1 is exceeded. But since the check valve 45 makes it impossible for the air to return to the turbo compressor 1, the turbine plant is fed with air through the pipe 35. Since the compressor 1 and the blower 3 take very little power, because they deliver no air at that moment, the regulating operation occurs very quickly. The charging set 3 and 4 is quickly accelerated and the resulting delivery of power from the main plant is at the moment very great, so that the temporary fall in speed, due to sudden loading, is at once adjusted.

Herein the gas turbine plant has been described as comprising a turbo-compressor and a power turbine but it is to be understood that more than one turbine compressor and more than one power turbine may be used in the gas turbine plant.

I claim:

1. A gas turbine plant and accelerating apparatus which comprises a turbo compressor, a power turbine arranged to drive the load, the rotors of the turbo compressor and power turbine being on the same shaft; an accelerating turbine, a charging turbine and a charging blower the rotors of which are all mounted on the same shaft; a recuperator, a pipe for passing gas from the outlet side of the power turbine through the recuperator to the intake side of the charging turbine, a cooler, a pipe for passing gas from the outlet side of the charging blower through the cooler to the turbo compressor, a pipe for passing gas from the outlet side of the turbo compressor through the recuperator to the intake side of the power turbine, a by-pass at the intake side of the charging turbine, means responsive to the speed of the power turbine for increasing the quantity of bypassed gas when the speed of the power turbine increases and for decreasing the quantity of bypassed gas when the speed of the power turbine decreases, means for heating the gas before it enters the intake side of the power turbine, a container for air under pressure, means for delivering air from the container to the accelerating turbine, and means responsive to the speed of the power turbine for regulating the quantity of air delivered to the accelerating turbine in such a way that when the speed of the power turbine increases the amount of air admitted to the accelerating turbine is decreased or stopped and when the speed of the power turbine decreases the amount of air admitted to the accelerating turbine is increased.

2. A gas turbine plant and accelerating apparatus which comprises a turbo compressor, a power turbine arranged to drive the load, the rotors of the turbo compressor and power turbine being on the same shaft; an accelerating turbine, a charging turbine and a charging blower the rotors of which are all mounted on the same shaft; a recuperator, a pipe for passing gas from the outlet side of the power turbine through the recuperator to the intake side of the charging turbine, a cooler, a pipe for passing gas from the outlet side of the charging blower through the cooler to the turbo compressor, a pipe for passing gas from the outlet side of the turbo compressor through the recuperator to the intake side of the power turbine, a combustion chamber through which air passes from the recuperator to the intake side of the power turbine, conduit means for passing air from the accelerating turbine to the combustion chamber, a check valve in the conduit means for preventing a return of air from the combustion chamber to the accelerating turbine, a valve controlled opening at the outlet side of the accelerating turbine for discharging some air from the accelerating turbine to the atmosphere instead of permitting it to flow through the conduit means to the combustion chamber, a container for air under pressure, means for delivering air from the container to the accelerating turbine, and means responsive to the speed of the turbine for regulating the quantity of air delivered to the accelerating turbine in such a way that when the speed of the power turbine increases the amount of air admitted to the accelerating turbine is decreased or stopped and when the speed of the power turbine decreases the amount of air admitted to the accelerating turbine is increased.

3. A gas turbine plant and accelerating apparatus which comprises a turbo compressor, a power turbine arranged to drive the load, the rotors of the turbo compressor and power turbine being on the same shaft; an accelerating turbine, a charging turbine and a charging blower the rotors of which are all mounted on the same shaft; a recuperator, a pipe for passing gas from the outlet side of the power turbine through the recuperator to the intake side of the charging turbine, a cooler, a pipe for passing gas from the outlet side of the charging blower through the cooler to the turbo compressor, a pipe for passing gas from the outlet side of the turbo compressor through the recuperator to the intake side of the power turbine, means for heating the gas before it enters the intake side of the power turbine, a container for air under pressure, valve controlled conduit means for delivering air from the container to the accelerating turbine, a speed governor driven by the power turbine, means actuated by the governor for closing the valve to decrease the flow of air through the valve controlled conduit when the speed of the power turbine increases and for opening the valve to increase the flow of air when the speed of the power turbine decreases, valve means actuated by the governor for bypassing to the atmosphere some of the gas from the power turbine flowing to the charging turbine, a pipe for passing air from the outlet side of the accelerating turbine to the means for heating gas, and valve means actuated by the governor for discharging air from the outlet side of the accelerating turbine to the atmosphere.

4. A gas turbine plant and accelerating apparatus which comprises a turbo compressor, a power turbine arranged to drive the load and the turbo compressor, a charging set comprising a charging turbine and charging blower, means for passing gas from the charging blower to the turbo compressor, means for heating the gas from the turbo compressor and delivering the hot gas to the power turbine, means for passing gas from the power turbine to the charging turbine, the rotors of the charging set being on a common shaft, an accelerating turbine operatively connected to the said shaft arranged to aid in driving the charging blower, means for charging gas under pressure to the accelerating turbine when the aid thereof is desired temporarily, a recuperator connected by conduit to the power turbine, and a pipe connecting the outlet side of the accelerating turbine with the recuperator whereby the gas from the accelerating turbine may flow through the recuperator and then into the intake side of the power turbine.

5. A gas turbine plant and accelerating apparatus which comprises a turbo compressor, a power turbine arranged to drive the load and the turbo compressor, a charging set comprising a charging turbine and charging blower, means for passing gas from the charging blower to the turbo compressor, means for heating the gas from the turbo compressor and delivering the hot gas to the power turbine, means for passing gas from the power turbine to the charging turbine, the rotors of the charging set being on a common shaft, an accelerating turbine operatively connected to the said shaft arranged to aid in driving the charging blower, means for charging gas under pressure to the accelerating turbine when the aid thereof is desired temporarily, a valve-controlled bypass for discharging a part of the gas from the means for passing gas from the power turbine to the charging turbine to the atmosphere, and means responsive to the speed of the power turbine for operating the valve of the bypass.

WALTER TRAUPEL.